United States Patent Office 3,565,868
Patented Feb. 23, 1971

3,565,868
POLYMERS OF UNSYMMETRICAL DISUBSTITUTED HYDRAZINE
Edward A. Sedor, Bloomington, and Robert C. Slagel, Savage, Minn., assignors to Ashland Oil & Refining Company, Ashland, Ky., a corporation of Kentucky
No Drawing. Filed Mar. 19, 1968, Ser. No. 714,322
Int. Cl. C08g 33/04
U.S. Cl. 260—78.3        7 Claims

ABSTRACT OF THE DISCLOSURE

Polymers comprising the reaction product of:
(A) unsymmetrical disubstituted hydrazine and
(B) a material selected from the group consisting of:
(1) epoxy-esters having at least one reactive epoxide group and at least one reactive carboxylic acid ester group, and
(2) mixtures of polyepoxides having a plurality of reactive epoxide groups and polyesters having a plurality of reactive ester groups.

These polymers find utility as decorative and/or protective coatings when applied to substrates.

DISCLOSURE

The present invention relates to polymers comprising the reaction product of:
(A) unsymmetrical disubstituted hydrazine and
(B) a material selected from the group consisting of:
(1) epoxy-esters having at least one reactive epoxide group and at least one reactive carboxylic acid ester group, and
(2) mixtures of polyepoxides having a plurality of reactive epoxide groups and polyesters having a plurality of reactive ester groups, wherein the reactants are substantially free of acid groups.

Suitable unsymmetrical disubstituted hydrazines are those of Formula I:

(I) 

wherein $R^1$ and $R^2$ can be alkyl, cycloalkyl, or aralkyl radicals of 1 to 30 carbon atoms. Examples of suitable alkyl radicals include, among others, heptacosyl, cyclohexyl, t-butyl, isopropyl, ethyl, and methyl. Lower alkyl radicals are preferred. Examples of suitable aralkyl radicals include, among others, benzyl, 2-phenyl-propyl, and 3-naphthyl-butyl. When $R^1$ and $R^2$ together represent a single divalent organic radical, this radical can be a ring of 3 to 10, preferably 4 to 6, carbon atoms with the optional inclusion of one or two hetero atoms such as oxygen, sulfur, and nitrogen. Examples of suitable unsymmetrical disubstituted hydrazines include, among others, 1-allyl-1-benzylhydrazine, 1-cyclohexyl-1-ethylhydrazine, 1-aminopyrrolidine, 4-aminomorpholine, amino hexamethylene imine, 1-aminopiperidine, 1-amino-4-phenylpiperazine, 1-amino-4-benzoylpiperazine, 1-aminoperhydroindole, 1-methyl-1-pentacosyl hydrazine, 1-ethyl-1-methyl hydrazine, and 1-1-dimethyl hydrazine which is most preferred because of its reactivity, cost and availability. Compounds such as 1,4-diamino piperazine having in effect two unsymmetrical hydrazine groups are also within the broad scope of the present invention.

The epoxy-esters useful in the present invention are those having at least one reactive epoxide group by which is meant a moiety of Formula II:

(II) 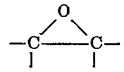

and at least one carboxylic acid ester group by which is meant a moiety of Formula III:

(III) 

The epoxide moiety of Formula II can be internal, wherein each carbon atom of the oxirane ring is attached to at least one organic radical or, more preferably, is terminal, wherein at least one carbon atom of the oxirane ring is attached to two hydrogen atoms. Suitable carboxylic acid ester groups are those which are generally saponifiable ester groups. Whether these groups are saponifiable can be determined by mixing the carboxylic acid ester with sodium hydroxide according to well-known procedures. A broad class of suitable epoxy-esters are those of Formula IV:

(IV) 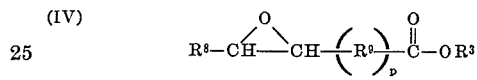

wherein $R^3$ is alkyl, and is preferably lower alkyl; $R^8$ is hydrogen or a monovalent organic radical such as alkyl, aryl, aralkyl and alkaryl; $R^9$ is a divalent organic radical such as alkylene and preferably lower alkylene, cycloalkylene, phenylene, lower alkyl phenylene, and phenyl lower alkylene.

Other classes of suitable epoxy-esters include those of Formulae V through VIII, below, wherein $n$ is an integer from 1 to 30, preferably 1 to 8 inclusive:

(V) 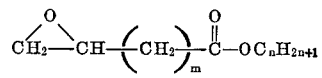

wherein $m$ is an integer from 1 to 9 inclusive;

(VI) 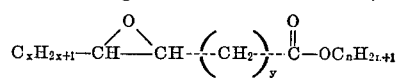

wherein $x$ and $y$ are integers from 0 to 15 with the the proviso that $x+y$ is equal to or less than 15;

(VII) 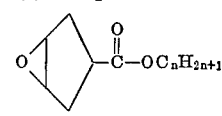

and (VIII) 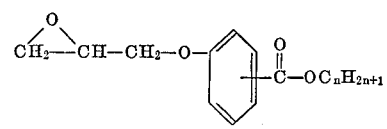

as well as epoxidized triglyceride oils such as epoxidized linseed oil or epoxidized soybean oil, sold as Admex 710 and Admex 711.

The polyepoxides useful in the present invention are those having a plurality of reactive epoxide groups. A broad class of suitable polyepoxides are those of Formula IX:

(IX) 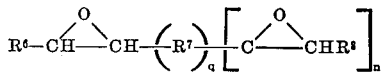

wherein $R^6$ and $R^8$ are independently selected from the group consisting of hydrogen and monovalent organic radicals such as alkyl, cycloalkyl, aryl, aralkyl and alkaryl; $R^7$ is an organic radical such as alkylene, arylene, or cycloalkylene; $n$ is an integer from 1 to 4 inclusive but is preferably 1; and $q$ is 0 to 1, with the proviso that when $q$ is 0, $n$ is 1.

Other suitable polyepoxides include those of Formulae X through XVI, below:

(X)
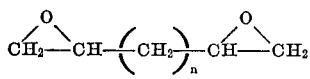

wherein $n$ is an integer from 0 to 12 inclusive;

(XI)

(XII)
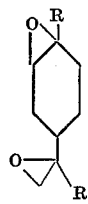

wherein R is H or $CH_3$;

(XIII)
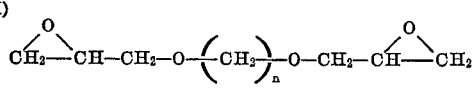

wherein $n$ is an integer from 1 to 4 inclusive;

(XIV)
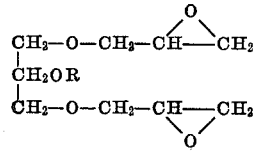

wherein R is H or $$-O-CH_2-CH\overset{O}{-}CH_2$$

(XV)
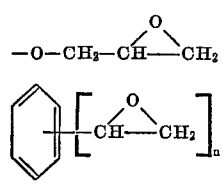

wherein $n$ is 2 or 3;

(XVI)
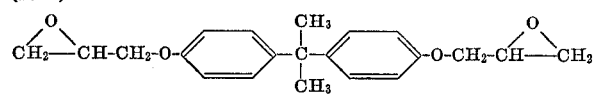

and the polymers thereof sold under the trade name "Epon." In general, these polymers are the reaction product of bisphenol-A and an epihalohydrin, preferably epichlorohydrin; and compounds such as:

(XVII)
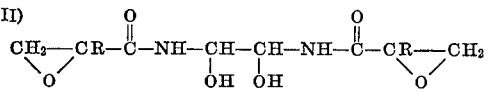

wherein R is H or lower alkyl, and other similar compounds disclosed in British Pat. 1,060,848.

The polyesters useful in the present invention are compounds having a plurality of carboxylic acid ester moieties of Formula III. A broad class of suitable polyesters are those of Formula XVIII:

(XVIII)
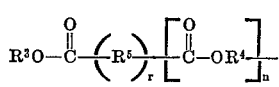

wherein $R^3$ and $R^4$ are alkyl, preferably lower alkyl and most preferably methyl; $R^5$ is an organic radical and preferably an aliphatic or aromatic radical such as alkylene, preferably lower alkylene, lower cycloalkylene, phenylene, biphenyl, or naphthylene; the preferred alkylene radical being $(CH_2)_m$, $m$ being an integer from 1 to 11 inclusive; wherein $r$ is 0 or 1 and $n$ is an integer from 1 to 4 inclusive and is preferably 1.

Examples of suitable polyesters include, among others, dimethyl fumarate, diethyl maleate, diisopropyl terephthalate, di-t-butyphthalate, dodecyl-methyl phthalate, methyl-ethyl itaconate, dimethyl oxalate, methyl-ethylmalonate, 1,2,4-benzenetricarboxylic acid trimethyl ester, 2,6-naphthalene dicarboxylic acid dimethyl ester, as well as those of Formulae XIX through XXIII:

(XIX)

(XX)
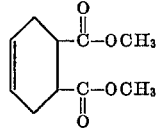

(XXI)
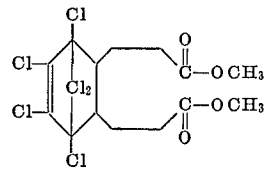

(XXII)
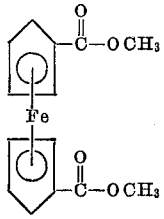

(XXIII)
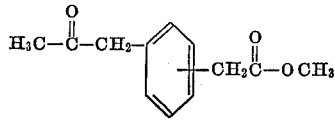

Except where otherwise indicated, the radicals $R^1$ through $R^9$ are preferably hydrocarbon radicals but can be substituted with one or more, preferably one to three, substituents which are substantially inert to the reactants employed in the process of the present invention. Examples of suitable substituents include, hydroxyl, mercapto, and lower alkoxy such as methoxy. The reactants and therefore the radicals $R^1$ through $R^9$ should be substantially free of acid groups, such as carboxylic acid groups, which yield hydrogen ions in polar media.

The polymers of the present invention are produced by mixing stoichiometric amounts of the reactants at temperatures of 0 to 150° C., preferably 20 to 80° C., for periods of 5 minutes to 7 days, preferably 1 hour to 3 days within the preferred temperature range; at atmospheric pressure generally or at subatmospheric pressures or superatmospheric pressures when volatile reactants are employed. The reaction can be conducted without a solvent or in the presence of solvents in amounts up to infinite dilution. Suitable solvents include water and lower alkanols such as t-butanol or isopropanol, although the latter are preferred. When the reactants comprise an unsymmetrical disubstituted hydrazine and an epoxy ester, the reaction proceeds according to Equation 1:

(Eq. 1)
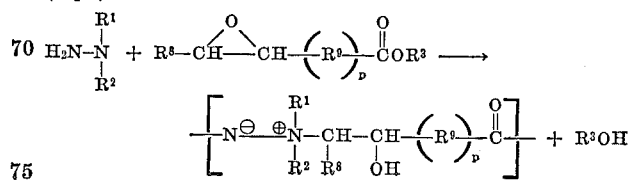

wherein $R^1$, $R^2$, $R^3$, $R^8$, $R^9$, and $p$ have the above-defined meanings. When the reactants comprise an unsymmetrical disubstituted hydrazine, a polyepoxide and a polyester, the reaction proceeds according to Equation 2:

(Eq. 2)

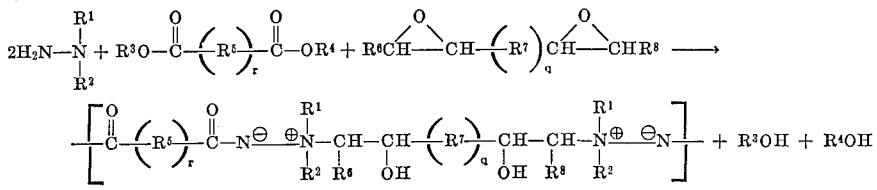

wherein $R^1$, $R^2$, $R^3$, $R^4$, $R^5$, $R^6$, $R^7$, $R^8$, $q$ and $r$ have the above-defined meanings.

The polymers of the present invention can be pyrolyzed by heating to temperatures of 150 to 200° C. The pyrolysis is believed to first split the polymer to form a diisocyanate and a bis($\beta$-hydroxytertiary amine) which then re-reacts to give a polyurethane with pendant tertiary amine groups. The tertiary amine can also act as a catalyst for the formation of the polyurethane. Since the unpyrolyzed polymers of the present invention are water-soluble, whereas the pyrolyzed polymers are water-resistant, these polymers can be applied as aqueous dispersions to a wide variety of substrates by procedures such as brushing, spraying or dipping, followed by pyrolysis to form durable, water-resistant, protective and/or decorative coatings.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

In a pressure bottle are placed 8.7 g. dimethyl adipate, 6.0 g. 1,1-dimethyl hydrazine, and 7.1 g. freshly distilled 1,7-octadiene diepoxide in 50 ml. of isopropanol. The mixture is stirred at room temperature for 72 hours. Infrared (IR) analysis shows the presence of ester so the reaction is continued for three more days. At this point the reaction mixture has turned cloudy. A polymer precipitates out in acetone to give a white hygroscopic solid which is soluble in methanol and water but insoluble in acetone, chloroform, benzene and hexane. The infrared spectrum shows bands at 3280 (OH stretch) and 1590 (aminimide) cm.$^{-1}$.

The polymer is dissolved in water, spread onto a glass plate and dried in an oven at 100° C. for 3 hours. The resultant coating is sticky to the touch. The plate is replaced in the oven and the temperature raised to 160° C. and held for 14 hours. A hard (Sward No. of 44), water-insoluble film results which adheres strongly to the glass.

EXAMPLE 2

Into a 1-liter flask are placed 17.4 g. dimethyl adipate and 12.0 g. 1,1-dimethyl hydrazine in 150 ml. of isopropanol. To the stirred solution is added 36.0 g. Epon 828 (Shell Chemical Co.). The resulting mixture is stirred at room temperature for one week. A sample of the product is evaporated in vacuo. The infrared spectrum shows aminimide absorption at 1575 cm.$^{-1}$ as well as some ester absorption at 1735 cm.$^{-1}$.

The reaction mixture is evaporated until a solution having a 51% non-volatile content is obtained. The solution is then spread on a glass plate and air dried. The resultant film is then baked as follows:

(a) 100° C. for 45 minutes to give a clear, colorless, fairly hard film. IR still shows aminimide and OH absorption.

(b) 160° C. for 45 minutes to give a clear yellow film—Sward hardness of 26. IR no longer shows aminimide absorption but does show new asborption at 1700 cm.$^{-1}$.

Epon 828 is described as the condensation product of 1 mole of bisphenol-A with 2 moles of epichlorohydrin.

EXAMPLE 3

The procedure of Example 2 is repeated except that 19.4 g. of dimethyl terephthalate is used in place of the dimethyl adipate. A solid precipitates near the end of the reaction. All solvent is evaporated in vacuo and the solid dissolved in chloroform. A film is spread on a glass plate, air dried, and then baked at 160° C. for 45 minutes to give a clear yellow, brittle coating. The IR results are similar to those of Example 2.

EXAMPLE 4

This example illustrates the synthesis of a polymer of the present invention which is the reaction product of an unsymmetrical disubstituted hydrazine and an epoxy ester.

In a 250 ml. round bottom flask fitted with a condenser, stirrer and reagent dropping funnel are placed methyl-10,11-epoxy-undecanenoate (10 g., 0.0447 mole) and isopropanol (50 ml.). To the flask is added slowly a solution of 1,1-dimethyl hydrazine (3 g., 0.0447 mole) in isopropanol (50 ml.) over a period of 1½ hours. The stirrer is turned on and the flask and its contents permitted to agitate for two days whereupon a small amount of the reaction mixture is removed from the flask, spread as a film on a salt plate, dried at 102° C. for one hour and then baked at 170° C. for 9 hours. The film is hard, scratch resistant, and dark brown in color. The IR spectrum shows loss of the aminimide band at about 1580 cm.$^{-1}$ and appearance of a band near 1700 cm.$^{-1}$ attributed to absorption of urethane groups.

EXAMPLE 5

The procedure of Example 4 is repeated employing the same times, reactants, and conditions except that the methyl-10,11-epoxy-undecanenonate is replaced by an equimolar amount of glycidyl (p-carbomethoxy phenyl) ether, the reaction mixture is agitated overnight at 65° C. and the film was baked at 165° C. for 30 minutes. The IR spectrum shows loss of the aminimide band at about 1580 cm.$^{-1}$ and appearance of a band near 1700 cm.$^{-1}$ attributed to absorption of urethane groups.

EXAMPLE 6

The procedure of Example 4 is repeated employing the same times, reactants and conditions except that the methyl-10,11-epoxy undecanenonate is replaced successively by epoxy esters of Formulae XXIV and XXV with similar results.

(XXIV) 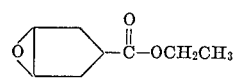

(XXV) 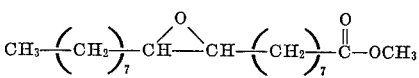

Although the invention has been described in considerable detail with reference to certain preferred embodiments thereof, it will be understood that variations and modifications can be effected within the spirit and scope of the invention as described above and as defined in the appended claims.

What is claimed is:

1. The polymer prepared by reacting an epoxy ester having the formula:

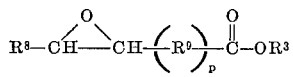

wherein
$R^3$ is an aliphatic or aromatic hydrocarbon radical,
$R^8$ is hydrogen, alkyl, aryl, aralkyl or alkaryl,
$R^9$ is alkylene, cycloalkylene, phenylene, lower alkyl phenylene or phenyl lower alkylene, and
$p$ is 0 or 1
and an unsymmetrical disubstituted hydrazine having the formula:

wherein $R^1$ and $R^2$, when taken singly, represents the same or different alkyl, cycloalkyl, aralkyl radicals or, when taken together with the nitrogen atom to which they are attached, represent a cycloaliphatic radical having from 3 to 10 atoms.

2. The polymer in accordance with claim 1 wherein $R^3$ and $R^8$ are lower alkyl and $R^9$ is lower alkylene.

3. The polymer in accordance with claim 2 wherein $R^1$ and $R^2$ are lower alkyl.

4. The polymer in accordance with claim 3 wherein $R^1$ and $R^2$ are methyl.

5. A polymer in accordance with claim 1 having repeating units of the formula:

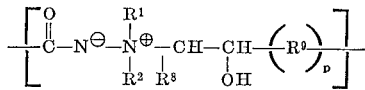

6. The polymer in accordance with claim 5 wherein $R^1$ and $R^2$ are lower alkyl, $R^8$ is hydrogen or lower alkyl, and $R^9$ is alkylene.

7. The polymer in accordance with claim 1 wherein the epoxy ester has the formula:

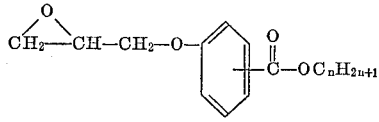

wherein $n$ is an integer from 1 to 30 inclusive.

References Cited

UNITED STATES PATENTS 2,371,133   3/1945   Graenacher et al. __ 260—404.5

WILLIAM H. SHORT, Primary Examiner

E. A. NIELSEN, Assistant Examiner

U.S. Cl. X.R.

117—161; 260—2, 18, 47